United States Patent [19]

Torok et al.

[11] Patent Number: 5,371,320
[45] Date of Patent: Dec. 6, 1994

[54] SPACER-DAMPER

[75] Inventors: John G. Torok, Hopewell Junction; Francesco G. Chiarella, Poughkeepsie, both of N.Y.

[73] Assignee: Fargo Mfg. Co., Inc., Poughkeepsie, N.Y.

[21] Appl. No.: 121,261

[22] Filed: Sep. 13, 1993

[51] Int. Cl.⁵ .......................... H02G 7/12; H02G 7/14
[52] U.S. Cl. .......................................... 174/42; 174/146
[58] Field of Search ................ 174/42, 146; 248/68.1, 248/74.1, 70; 188/378, 379, 380

[56] References Cited

U.S. PATENT DOCUMENTS

| | | | |
|---|---|---|---|
| 3,300,575 | 1/1967 | Short | 174/146 X |
| 3,978,276 | 8/1976 | Poffenberger et al. | 174/42 |
| 4,223,176 | 9/1980 | Hawkins | 174/42 |
| 4,278,833 | 7/1981 | Hawkins | 174/42 |
| 4,471,156 | 9/1984 | Hawkins | 174/42 |

FOREIGN PATENT DOCUMENTS 0931647 8/1973 Canada .......................... 174/146

OTHER PUBLICATIONS

Anon, "Space Damper for Overhead power transmission lines" Mar. 1975, No. 131, p. 11.

Primary Examiner—Leo P. Picard
Assistant Examiner—Hyung S. Sough
Attorney, Agent, or Firm—Kane, Dalsimer, Sullivan, Kurucz, Levy, Eisele & Richard

[57] ABSTRACT

A spacer-damper for maintaining the spacing between electrical transmission conductors or the like and for damping any vibratory motion of such conductors includes a rigid spacer in the form of a multi-sided frame having at least two spherical mounts for conductor clamps. The clamps are connected to the spherical mounts, but separated therefrom by a resilient damping covering on the spherical mounts. Indentations on the spherical mounts and on the clamps mate with protrusions on inner and outer surfaces of the resilient damping covering to inhibit relative movement therebetween. Longitudinal, transverse and vertical vibrations in the conductors held by the clamps are damped by shear forces which arise within the resilient damping material, longitudinal vibrations being parallel to the ground axially along the length of the conductors, transverse vibrations being parallel to the ground but perpendicular to the conductors, and vertical vibrations being perpendicular to the ground.

20 Claims, 6 Drawing Sheets

SPACER-DAMPER

BACKGROUND OF THE INVENTION

1. Field of the Invention

The present invention relates generally to the separation of electrical transmission conductors or the like and, more specifically, is directed toward a device for maintaining a predetermined minimum spacing between individual conductors in a bundled conductor transmission line, while at the same time suppressing and damping undesired vibrations and oscillations of the conductors.

2. Description of the Prior Art

Damage to individual conductors in bundled electrical transmission conductors may be caused by the vibration and oscillation of the conductors. Such undesired motions may be induced by the wind, and may have longitudinal, transverse and vertical components. The longitudinal components are movement parallel to the ground longitudinally along the axis of the conductor. The transverse components are parallel to the ground, but perpendicularly of the conductor. The vertical components are movements of the conductor perpendicular to the ground. Suppression of these vibrations and oscillations requires a resilient connection between the means by which all the conductors in a bundle are spaced from one another, the spacer, and the means by which each conductor is clamped to the spacer, the clamps, allowing a limited amount of flexing to occur. Since both longitudinal and transverse oscillations may occur simultaneously, the spacer and clamps must permit limited movement of the individual conductors longitudinally and transversely relative to each other in order that such oscillations may be suppressed.

The motion of the conductors in a bundle may also be caused by electrical power surges, which cause the conductors in a bundle to be attracted toward the center thereof. For example, in a bundle of three conductors defining, in cross section, a triangle, a surge causes the conductors to be attracted to a point at the center of the triangle. Similarly, in a bundle of four conductors defining, in cross section, a quadrilateral, a surge causes the conductors to be attracted to a point at the center of the quadrilateral.

Prior-art devices have not provided wholly satisfactory results. For example, U.S. Pat. No. 3,978,276 to Poffenberger et al. shows a rigid spacer composed of mating half-sections having hollow spherical sockets for receiving the spherical end portions of individual conductor connector structures. The opposite ends of the connectors are fashioned for effecting a gripping connection with a conductor. A resilient damping material is interposed between the spherical connector end portions and their associated receiving sockets, and is secured to both the ball and the socket so that, on pivoting of the connector arm attendant conductor vibration or oscillation, the damping material is placed in shear to effect a damping action. However, the amount of flexing movement permitted by this device has not proven to be sufficient to bring about a satisfactory damping of the oscillatory motions of the individual conductors in a bundle.

The object of the present invention is to provide an improved spacer-damper superior to those of the prior art, such as that shown in U.S. Pat. No. 3,978,276.

SUMMARY OF THE INVENTION

The present spacer-damper includes an integral rigid spacer means having at least one elongated portion, but general having several elongated portions defining a multi-sided figure. At the ends of the elongated portion, portions, are substantially spherical portions connect thereto by arms. Accordingly, where there are several elongated portions defining a multi-sided figure, there is substantially spherical portion at each corner, or vertex, the multi-sided figure.

Where there are several elongated portions of the integral rigid spacer means defining a multi-sided figure, or polygon, that figure may be considered to define a plane. In this regard, each substantially spherical portion of the rigid spacer means has a hole passing through its center. The of the holes through all of the substantially spherical portions in a given rigid spacer means are parallel to another, and perpendicular to the elongated portion, portions, thereof. Where there are more than one such elongated portions, the axes of the holes through the centers of the substantially spherical portions are normal to the plane defined thereby.

The holes through the substantially spherical portions gradually narrow or taper in diameter to a minimum at the centers thereof so as to have, in cross section, the shape of an hourglass.

The surface of the substantially spherical portions may be considered to comprise two hemispheres, each being that half of the surface adjacent to one of the two openings of the hole. Each hemisphere has at least one indented area, or dimple, preferably has several such indented areas.

The two hemispheres are covered with damping mechanisms, which are substantially hemispherical shells of a resilient material having inner and outer surfaces. The inner surfaces have the same number of protruding areas as the number of indented areas on their respective hemispheres, these protruding areas corresponding to and mating with those indented areas, so that the damping mechanism may not move relative to the hemisphere. The damping mechanisms further have central holes passing therethrough corresponding to a aligning with the holes through the substantially spherical portion of the rigid spacer means.

A clamp body and a clamp body cover, each of which has a substantially hemispherical concave portion or surface, are placed over the two covered hemispheres of the substantially spherical portion. As the inner surfaces of the damping mechanisms each had at least one protruding area, and preferably several such areas, so also do the outer surfaces thereof. In turn, the substantially hemispherical concave portion or surface of the clamp body and clamp body cover have at least one indented area corresponding to and mating with the protruding area, or areas, on the outer surfaces of the damping mechanisms, so that the clamp body and clamp body cover may not move relative to the damping mechanisms. The substantially hemispherical concave portion or surface of the clamp body or clamp body cover each can have a central hole passing therethrough, corresponding to and aligning with the central holes through the damping mechanisms, and the holes through the substantially spherical portions of the rigid spacer means. All are assembled into a unit by passing an elongated means for attaching the clamp body, damping mechanisms, substantially spherical portions, and clamp body cover through their aligned holes, and by securing same in some suitable manner compressing the assembly so formed together. A rivet is but one suitable elongated means for effecting such attachment.

The clamp body also includes a clamp-half in which a conductor may be disposed. Attached to the clamp body is a clamp keeper which, together with the clamp-half, forms a passage within which a conductor may be held when the clamp keeper is closedly secured to the clamp body. The clamp keeper may be attached to the clamp body by a hinge means, and secured in a closed position thereto by a bolt.

The present spacer-damper will now be described in more complete detail by making reference to several drawing figures included herewith and identified below, and the manner of operation fully explained.

DETAILED DESCRIPTION OF THE PREFERRED EMBODIMENT

Figure 1:
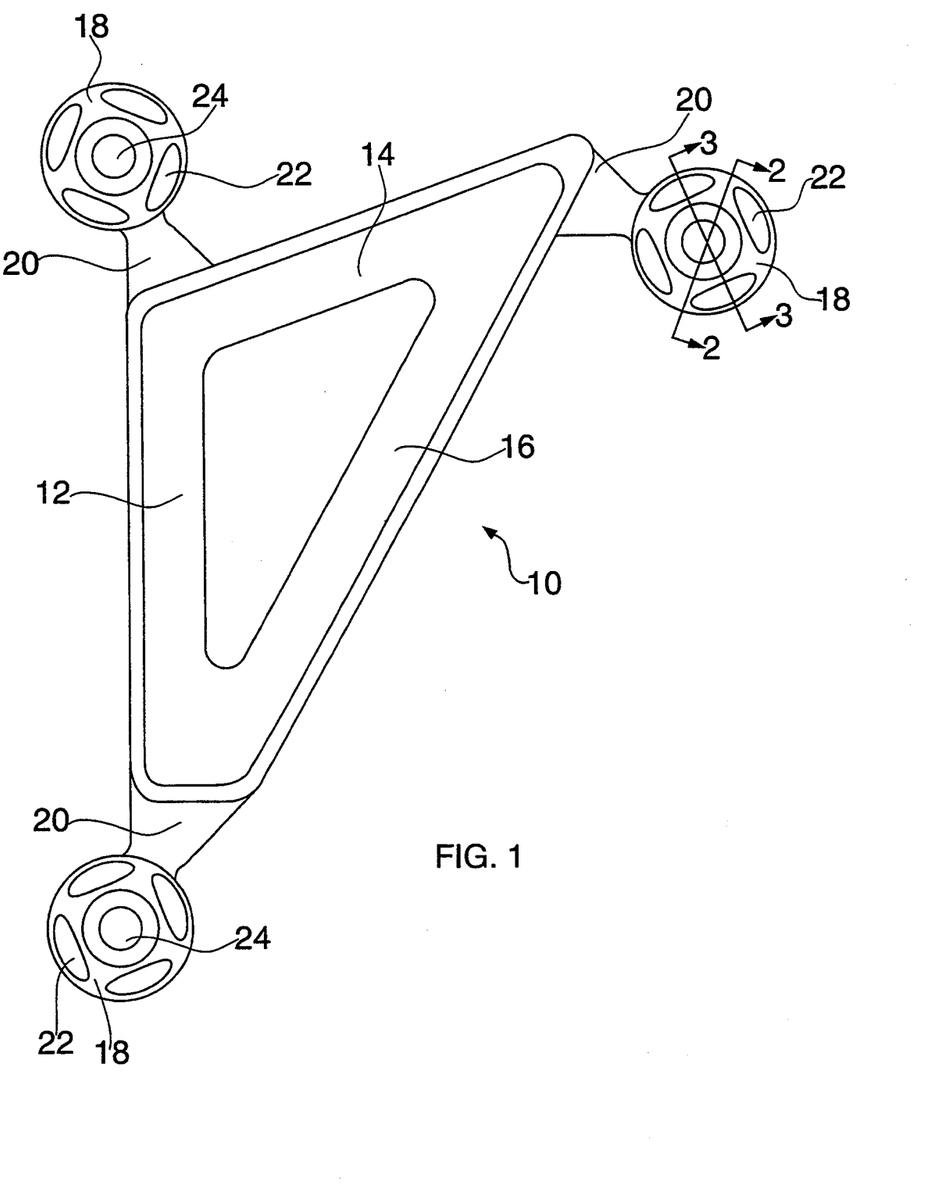
FIG. 1 is a plan view of a rigid spacer means of the present spacer-damper.

FIG. 1 shows a rigid spacer means 10 for a spacer-damper for maintaining the separation among the individual conductors in a bundle of three such conductors, and for suppressing or damping the vibrations of the three conductors relative to one another. It should be understood that embodiments of the spacer-damper may be designed to maintain the separations between or among two, four, six, eight or any other number of individual conductors in a bundle of such conductors, and to suppress or damp the oscillations thereof.

In FIG. 1, the rigid spacer means 10 assumes the shape of a triangle assembled from three elongated portions 12,14,16. At each end of each elongated portion 12,14,16 is a substantially spherical portion 18 connected thereto by an arm 20. Where, as in FIG. 1, the rigid spacer means 10 takes the shape of a triangle, there is a substantially spherical portion 18 at each vertex of the triangle. In general, the integral spacer means 10 is an integrally molded element, preferably molded of aluminum, and maintains the separations among the individual electrical transmission conductors. Each substantially spherical portion 18 has four indented areas 22 on each of its two hemispheres, of which the four indented areas 22 on the hemisphere facing the viewer of FIG. 1 are visible, and a hole 24 passing through its center. The hole 24 narrowingly tapers to a minimum diameter at the center of each substantially spherical portion 18.

Figure 2:
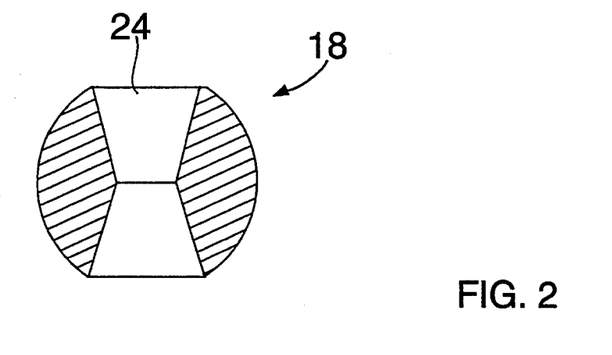
FIG. 2 is a cross section of a substantially spherical portion of the rigid spacer means taken as indicated by line 2—2 in FIG. 1.
Figure 3:
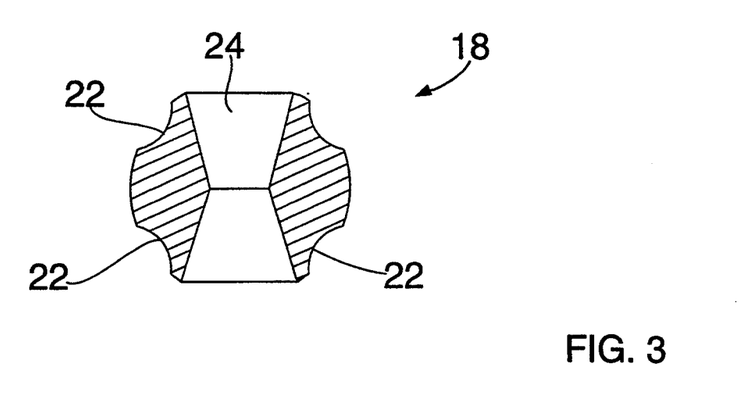
FIG. 3 is a cross section of the substantially spherical portion of the rigid spacer means taken as indicated by line 3—3 in FIG. 1.

This is made more apparent by the views presented in FIGS. 2 and 3. FIGS. 2 and 3 are cross sections of substantially spherical portion 18 taken as indicated by lines 2—2 and 3—3, respectively in FIG. 1. FIG. 2 shows hole 24 narrowingly tapering to a minimum diameter at the center of the substantially spherical portion 18. One skilled in the art may readily visualize that the essentially hourglass-shaped interior surface of hole 24 would give a straight member passing therethrough the freedom to rock in the azimuthal and polar directions about the axis of the hole 24. The relevance of this observation will be discussed below.

FIG. 3 also shows the above-described characteristics of hole 24, but also, because it is a cross section taken in a different direction from that shown in FIG. 2, shows four of the eight indented areas 22 on the surface of the substantially spherical portion 18.

Figure 4:
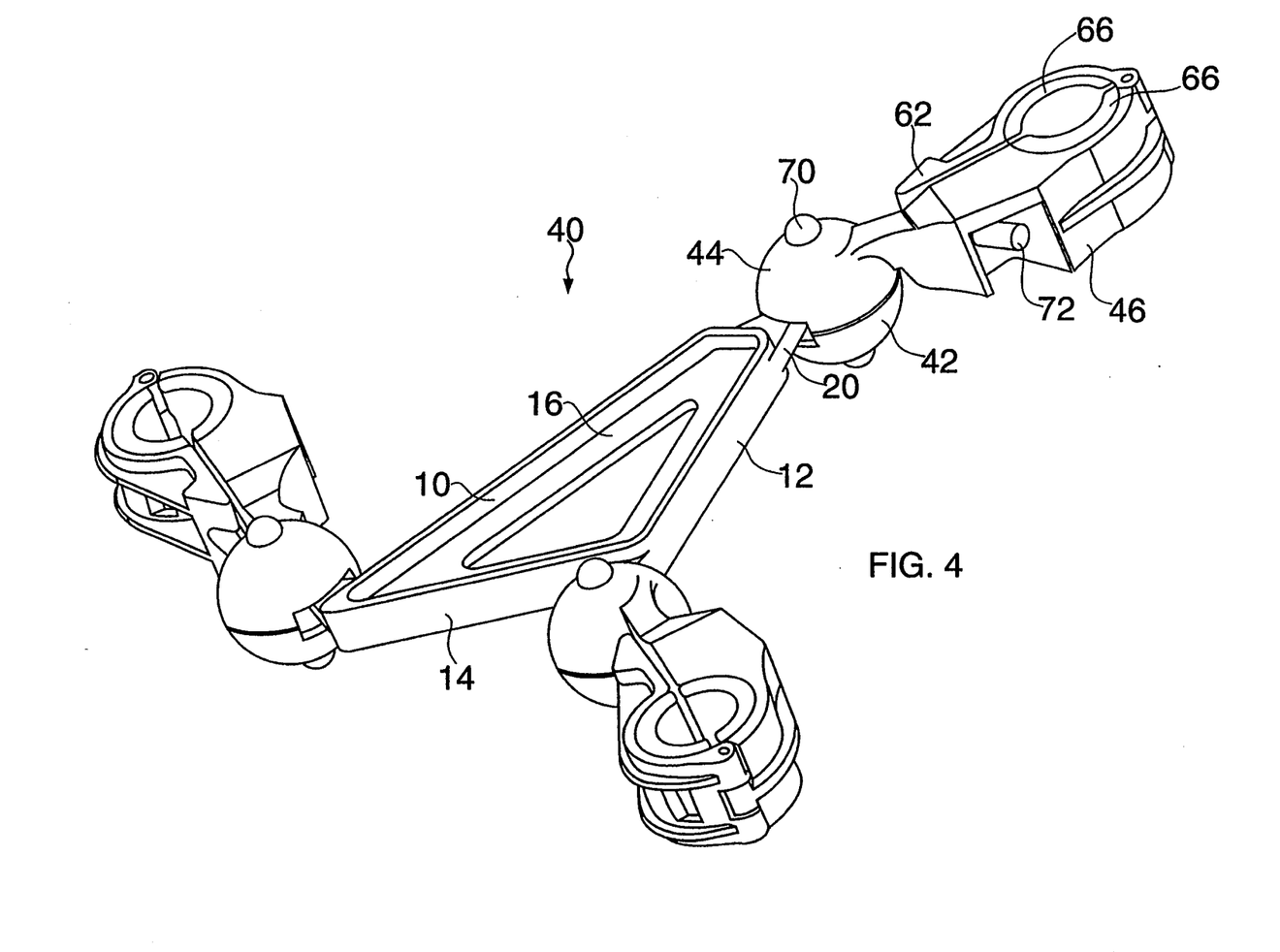
FIG. 4 is a perspective view of the spacer-damper of the present invention.
Figure 5:
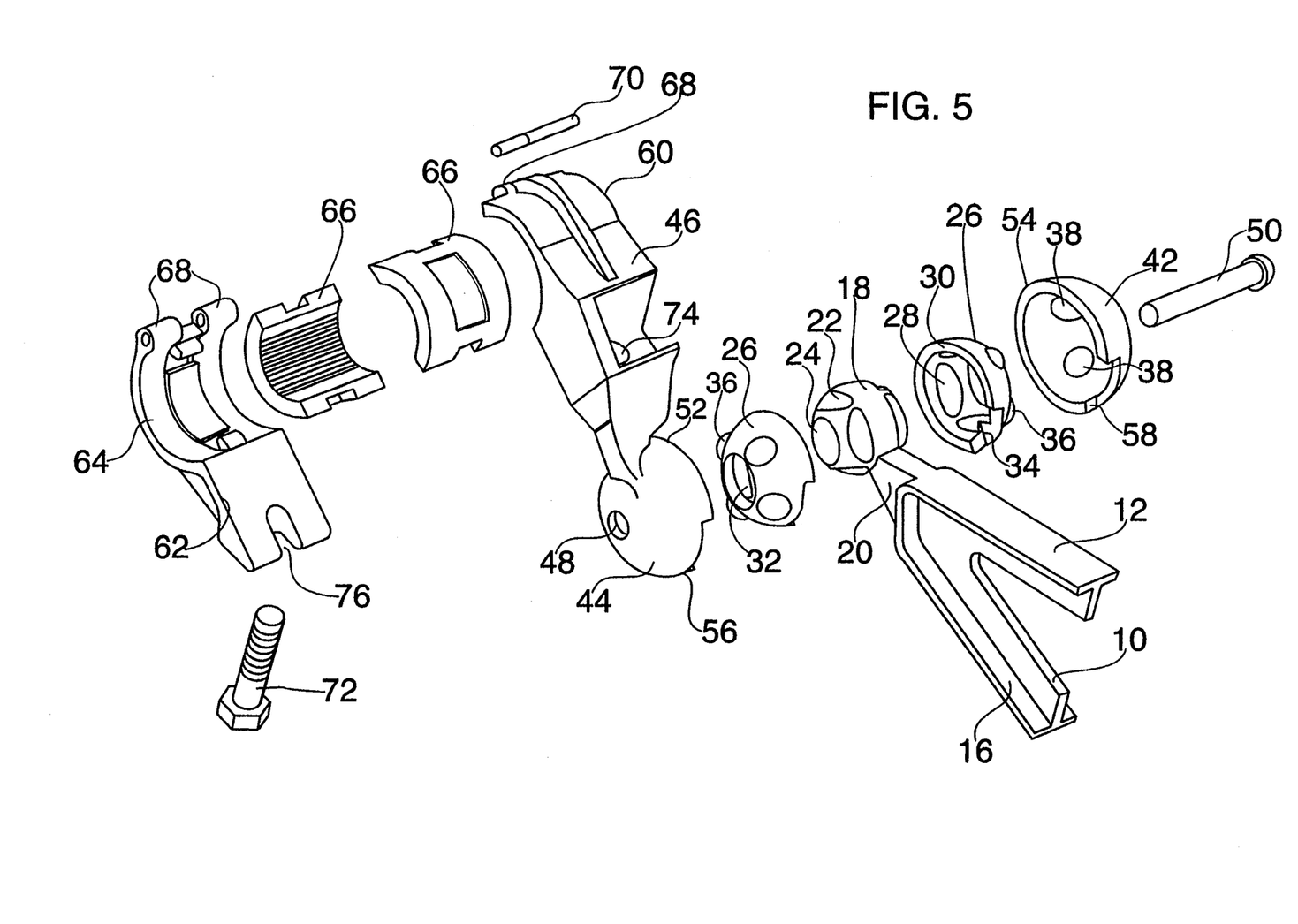
FIG. 5 is an exploded view of one of the conductor clamps on the spacer-damper.

FIG. 4 is a perspective view of the spacer-damper 40 of the present invention, and FIG. 5 is an exploded view of the conductor clamp assembly at the upper right-hand vertex of the spacer-damper 40. FIGS. 4 and 5 will be discussed together in the paragraphs to follow.

Referring first to FIG. 5, substantially spheric portion 18 is covered by two essentially hemispherical damping mechanisms 26. The inner surface of each damping mechanism 26 has protruding areas 28 corresponding to the indented areas 22 on the surface of the substantially spherical portion 18. The protruding areas 28 mate with the indented areas 22 when the damping mechanisms 26, which may be molded from rubber, neoprene or EPDM, are placed on the substantially spherical portion 18, so that the damping mechanisms 26 may not move relative thereto.

The damping mechanisms 26 also have a rim 30 and a hole 32 corresponding to and aligning with the hole 24 through the substantially spherical portion 18. Further, the rim 30 has a recess 34 to provide clearance for the arm 20. As a result, the rims 30 of the damping mechanisms 26 may abut against one another, and the damping mechanisms 26 more or less completely cover the substantially spherical portions 18.

It will be observed in FIG. 5 that the outer surface of each damping mechanism 26 also has protruding areas 36. In a manner identical to that which has been described above for the damping mechanisms 26 and the substantially spherical portion 18, the protruding areas 36 on one of the damping mechanisms 26 correspond to and mate with indented areas 38 on the interior hemispherical surface of a clamp body cover 42. Similarly, the protruding areas 36 on the other damping mechanism 26 correspond to and mate with indented areas 38 on the inner surface of a hemispherical portion 44 of a clamp body 46.

The hemispherical portion 44 of the clamp body 46 and the clamp body cover 42 each have central holes 48 corresponding to and aligning with the holes 32 through the damping mechanisms 26 and the hole 24 through the substantially spherical portion 18. A rivet 50 is directed through the aligned holes 48,32,24, and secured to hold the entire assembly firmly together.

It will be clear from the foregoing that the mating of the protruding areas 28 on the inner surfaces of the damping mechanisms 26 with the indented areas 22 on the substantially spherical portion 18, and the mating of the protruding areas 36 on the outer surfaces of the damping mechanisms 26 with the indented areas 38 on the inner surface of the hemispherical portion 44 of the clamp body 46 and on the interior hemispherical surface of the clamp body cover 42, as shown assembled in FIG. 4, prevents any sizeable movement of the clamp body 46 relative to the rigid spacer means 10. Because the damping mechanisms 26 are of a resilient material limited movement, causing shear within the damping mechanisms 26, can occur.

It will be recalled that the oscillations of the individual conductors in bundled electrical transmission conductors may have longitudinal, transverse and vertical components. The longitudinal components are movement parallel to the ground longitudinally along the axis of the conductor. In turn, this longitudinal component causes the clamp body 46 to move in a direction perpendicular to the plane of the rigid spacer means 10, such movement being permitted by the freedom provided to the rivet 50 by the hourglass shape of the hole 24 through the substantially spherical portion 18.

The transverse components are parallel to the ground, but perpendicularly of the conductor, and the vertical components are movements of the conductor perpendicular to the ground. The latter cause radial movement, that is, rotation about the axis defined by rivet 50, of the spacer-damper arm (clamp body 46). All of these vibrations are damped out by the shear within the damping mechanisms 26 brought about by the cooperation between protruding areas 28,36 and indented areas 22,38.

It should be further noted that the hemispherical portion 44 of the clamp body cover 42 has a rim 52, and the clamp body cover 42 has a rim 54. Rim 52 has a recess 56, and rim 54 has a recess 58. The rims 52,54 provide clearance for arm 20, as may be seen more clearly in FIG. 4. Further, the recesses 56,58 provide a limit on the amount by which the clamp body 46 may rotate about an axis defined by the rivet 50. Similarly, the hourglass shape of hole 24 in the substantially spherical portion 18 as well as the recesses 56,58 provides a limit on the amount by which the clamp body 46 may rock above and below the plane defined by the rigid spacer means 10.

Referring again to FIG. 5, the clamp body 46 includes a cylindrically concave portion 60 which functions as a clamp-half into which a conductor may be disposed. A clamp keeper 62 also includes cylindrically concave portion 64, which, together with that on the clamp body 46, defines a cylindrical volume within which a conductor may be clamped. Both the clamp body 46 and the clamp keeper 62 may be provided with resilient bushings 66 of rubber, neoprene or EPDM. Such bushings 66 ensure that the clamp body 46 and clamp keeper 62 may firmly grip the conductor disposed therebetween without causing any damage thereto.

The clamp body 46 and clamp keeper 62 each have integrally formed hinge elements 68 which may be connected to one another with a pin 70. This enables clamp keeper 62 to pivot relative to the clamp body 46, and to close to a position wherein their cylindrically concave portions 60,64 together define the cylindrical volume in which a conductor may be clamped. A bolt 72, threadingly secured within a hole 74 in the clamp body 46, may be used to lock the clamp keeper 62 in a closed position, the shaft of said bolt 72 passing through the notch 76 on the clamp keeper 62 to do so.

Figure 6:
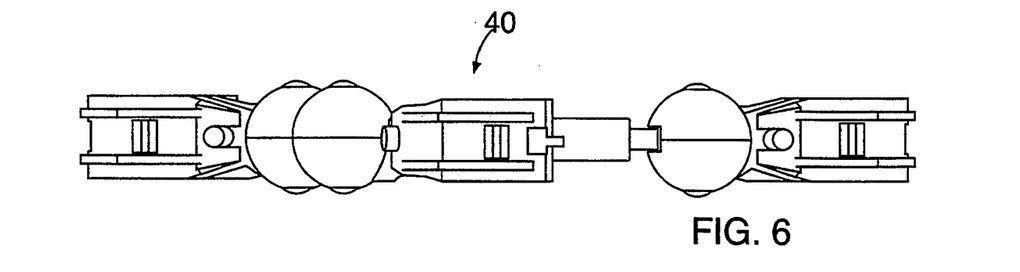
FIGS. 6 and 7 are side and plan views, respectively, of the spacer-damper shown in perspective in FIG. 4.
Figure 7:
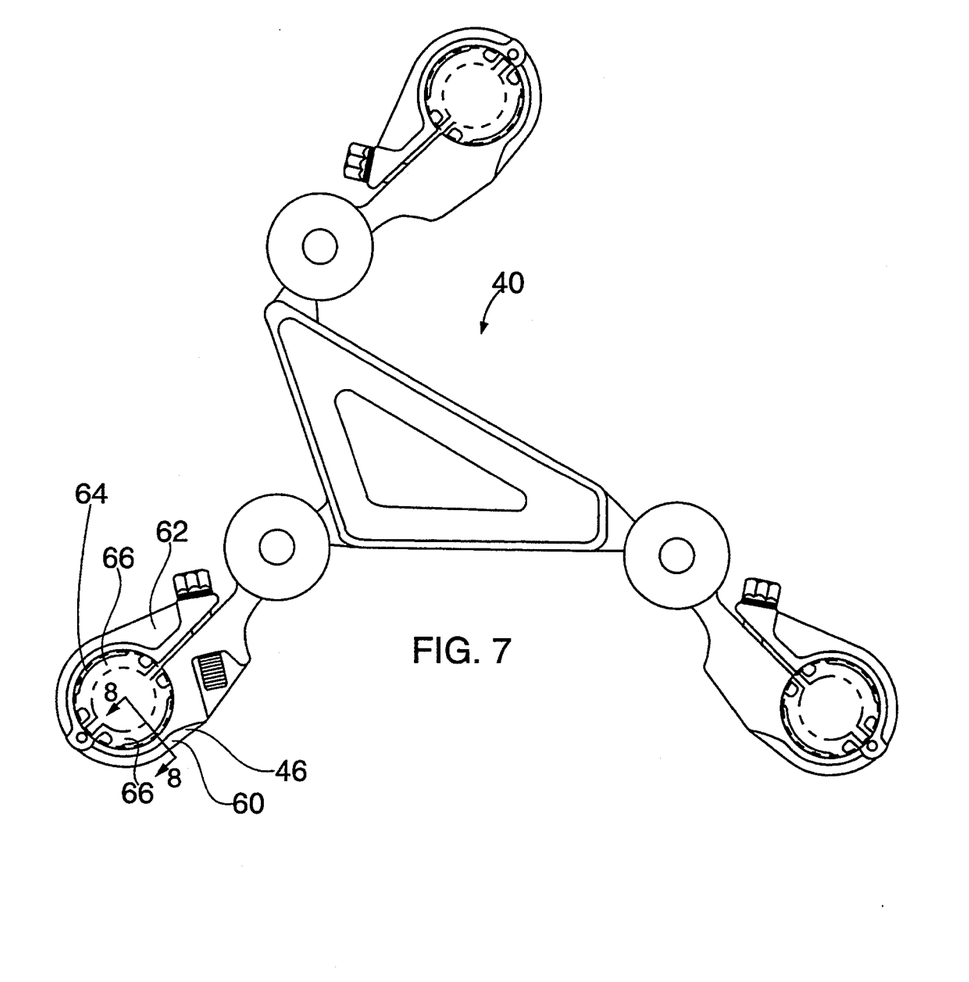

FIGS. 6 and 7 are side and plan views, respectively, of the spacer-damper 40 shown in perspective in FIG. 4.

Figure 8:
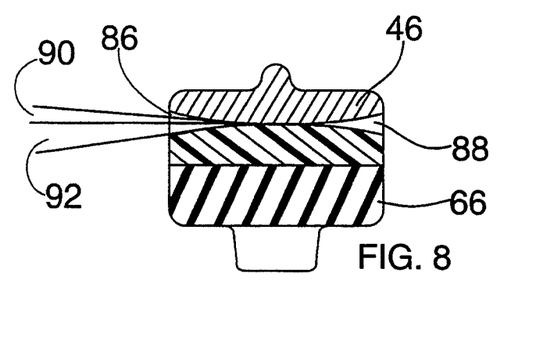
FIG. 8 is a cross section through a clamp body and its associated resilient bushing taken as indicated by line 8—8 in FIG. 7.

FIG. 8 is a cross section through a clamp body 46 and its associated resilient bushing 66 taken as indicated by line 8—8 in FIG. 7. It will be observed that the mutually facing surfaces of the clamp body 46, and specifically the cylindrically concave portion 60 thereof, and of its resilient bushing 66, may be convexly rounded so as to taper away from one another, as indicated at points 86 and 88. The cylindrically concave portion 60 of the clamp body 46 may taper by an angle 90 of 3°, while the facing portion of the resilient bushing 66 may taper by an angle 92 of 8°. In a similar manner, the mutually facing surfaces of the clamp keeper 62, and specifically the cylindrically concave portion 64 thereof, and of its resilient bushing 66, may be convexly rounded so as to taper away from one another.

The aforementioned tapering of the mutually facing surfaces of the resilient bushings 66 and the cylindrically concave portions 60,64 of the clamp body 46 and clamp keeper 62, respectively, allows the bushings 66 to move or rock to provide relief when, for example, a wind force is involved. This allows the bushings 66 to absorb the oscillating stress placed on the spacer-damper 40 due to longitudinal bundle articulation. The clearance allows the clamp body 46 and clamp keeper 62 to rotate about center approximately 10° per side without imparting stress to the spacer-damper 40 or to the conductor. This provides for improved fatigue resistance.

Figure 9:
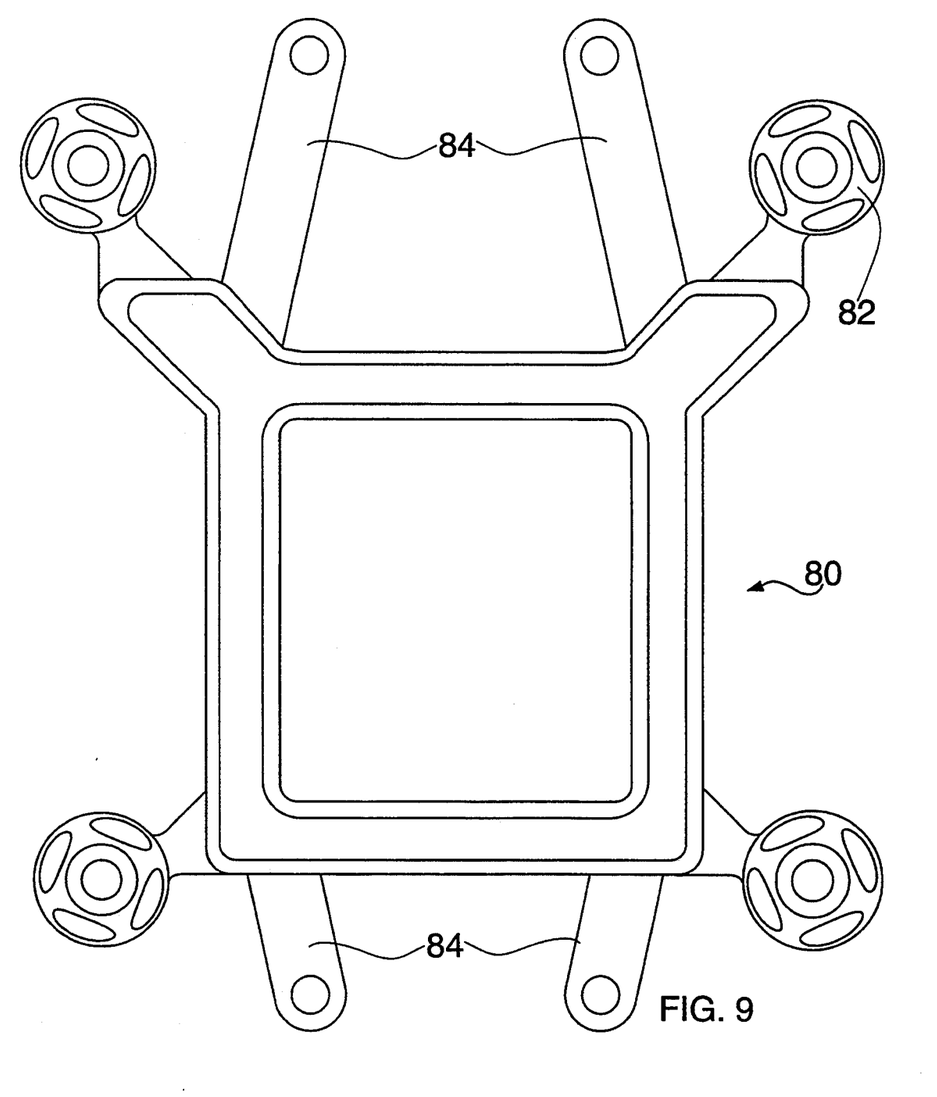
FIG. 9 is a plan view of a rigid spacer means for a conductor bundle having four individual conductors.

FIG. 9 is a plan view of a rigid spacer means 80 having four substantially spherical portions 82 for use in a spacer-damper for bundled electrical transmission conductors having four individual conductors. Members 84 extending therefrom are included on spacer-dampers close to towers for the attachment of corona rings.

While a particular embodiment of the present invention has been shown and described, it is clear that various changes and modifications may be made, and it is therefore intended in the following claims to cover all modifications and changes as may fall within the true spirit and scope of the invention.

What is claimed is:

1. A spacer-damper for maintaining the spacing between electrical transmission conductors or the like and for damping any vibratory motion of such conductors, said spacer-damp comprising:

a rigid spacer means, said rigid spacer means being integral element having at least one elongated portion with a first end and a second end and a substantially spherical portion at said first end and at said second end, each said substantially spherical portion being connected to its respective end of said elongated portion by an arm extending therefrom, each said substantially spherical portion having a hole extending diametrically therethrough from a first opening to second opening, said hole narrowing in diameter from said first opening to the center of said substantially spherical portion and widening in diameter from the center to said second opening, said hole thereby being hourglass-shaped, said substantially spherical portion comprising a first hemispherical portion centered about said first opening of said hole and a second hemispherical portion centered about said second opening of said hole, each said hemispherical portion having at least one indented area on the surface thereof;

a first and a second damping mechanisms for each said substantially spherical portion, each said damping mechanism being a substantially hemispherical shell of a resilient material having an inner surface, an outer surface and a rim, said first and second damping mechanisms being adapted to fit over said first and second hemispherical portions of said substantially spherical portion, respectively, to substantially cover said substantially spherical portion, said inner surface of said first and second damping mechanisms each having at least one protruding area corresponding to and mating with said indented areas on the surfaces of said first and second hemispherical portions, said outer surfaces of said first and second damping mechanisms each having at least one protruding area, said first and second damping mechanisms further having central hole passing therethrough and corresponding to and aligning with said hole through said substantially spherical portion of said rigid spacer means;

a clamp body for each of said substantially spherical portions, said clamp body being an integral element having a substantially hemispherical concave portion with a rim and a clamp-half for holding a conductor, said substantially hemispherical concave portion having at least one indented area corresponding to and mating with said at least one protruding area on the outer surface of said first damping mechanism, and having a central hole passing therethrough and corresponding to and aligning with said hole through said substantially spherical portion of said rigid spacer means and said central hole of said first damping mechanism, when said substantially hemispherical concave portion of said clamp body is placed thereover;

means for clamping a conductor within said clamp-half of said clamp body;

a clamp body cover for each of said substantially spherical portions, said clamp body cover having a substantially hemispherical concave surface having at least one indented area corresponding to and mating with said at least one protruding area on the outer surface of said second damping mechanism, and a rim and central hole passing therethrough and corresponding to and aligning with said hole through said substantially spherical portion of said rigid spacer means and said central hole in said second damping mechanism, when said clamp body cover is placed thereover; and an elongated means for attaching said clamp body, said first and second damping mechanisms, and said clamp body cover to each of said substantially spherical portions, said elongated means sequentially passing through said central hole in said substantially hemispherical concave portion of said clamp body, said central hole in said first damping mechanism, said hole in said substantially spherical portion of said rigid spacer means, said central hole in said second damping mechanism and said central hole in said clamp body cover.

2. A spacer-damper as claimed in claim 1 wherein said rigid spacer means has three said elongated portions arranged to define a triangle and said substantially spherical portion at each vertex of said triangle, and wherein the axes of the holes through said substantially spherical portions are normal to the plane of said triangle.

3. A spacer-damper as claimed in claim 1 wherein said rigid spacer means has four said elongated portions arranged to define a quadrilateral and said substantially spherical portion at each vertex of said quadrilateral, and wherein the axes of the holes through said substantially spherical portions are normal to the plane of said quadrilateral.

4. A spacer-damper as claimed in claim 1 wherein said rigid spacer means has six said elongated portions arranged to define a hexagon and said substantially spherical portion at each vertex of said hexagon, and wherein the axes of the holes through said substantially spherical portions are normal to the plane of said hexagon.

5. A spacer-damper as claimed in claim 1 wherein said rigid spacer means has eight said elongated portions arranged to define an octagon and said substantially spherical portion at each vertex of said octagon, and wherein the axes of the holes through said substantially spherical portions are normal to the plane of said octagon.

6. A spacer-damper as claimed in claim 1 wherein said first hemispherical portion of at least one of said substantially spherical portions has four said indented areas on the surface thereof, and wherein at least one of said first damping mechanisms has four said protruding areas on the inner surface thereof.

7. A spacer-damper as claimed in claim 1 wherein said second hemispherical portion of at least one of said substantially spherical portions has four said indented areas on the surface thereof, and wherein at least one of said second damping mechanisms has four protruding areas on the inner surface thereof.

8. A spacer-damper as claimed in claim 1 wherein at least one of said first and second damping mechanisms for at least one of said spherical portions of said rigid spacer means has a recess for a portion of the rim thereof, so that said arm connecting said substantially spherical portion to said at least one elongated portion extends through an opening defined by said recess, and said rims of said first and second damping mechanisms abut against one another, when said first and second damping mechanisms cover said substantially spherical portion.

9. A spacer-damper as claimed in claim 1 wherein said substantially hemispherical concave portion of at least one of said clamp bodies has four said indented areas on the surface thereof, and wherein at least one of said first damping mechanisms has four said protruding areas on the outer surface thereof.

10. A spacer-damper as claimed in claim 1 wherein said substantially hemispherical concave surface of at least one of said clamp body covers has four said indented areas on the surface thereof, and wherein at least one of said second damping mechanisms has four said protruding areas on the outer surface thereof.

11. A spacer-damper as claimed in claim 1 wherein at least one of said substantially concave portion of said clamp body and said substantially concave surface of said clamp body cover for at least one of said spherical portions of said rigid spacer means has a recess of a portion of the rim thereof, so that said arm connecting said substantially spherical portion to said at least one elongated portion extends through an opening defined by said recess, and so that said opening limits the amount by which said clamp body rotates about an axis defined by said elongated means.

12. A spacer-damper as claimed in claim 1 wherein said clamp-half on at least one of said clamp bodies is a substantially semicylindrical concave surface.

13. A spacer-damper as claimed in claim 12 wherein said means for clamping a conductor within said clamp-half of said clamp body is a clamp keeper, said clamp keeper having a substantially semicylindrical concave surface, means for attaching said clamp keeper to said clamp body, and means for locking said clamp keeper to said clamp body in a closed position, said clamp-half of said clamp body and said clamp keeper together defining a cylindrical volume for clamping a conductor when said clamp keeper is locked to said clamp body.

14. A spacer-damper as claimed in claim 13 wherein said means for attaching said clamp keeper to said clamp body is a hinge integrally formed in said clamp keeper and said clamp body and joined by a pin.

15. A spacer-damper as claimed in claim 13 wherein said means for locking said clamp keeper to said clamp body in a closed position is a bolt.

16. A spacer-damper as claimed in claim 12 further comprising a bushing of a resilient material on said substantially semicylindrical concave surface of said clamp body.

17. A spacer-damper as claimed in claim 16 wherein said bushing of resilient material and said substantially semicylindrical concave surface of said clamp body have mutually facing surfaces, at least one of said mutually facing surfaces being convexly rounded to provide a taper so as to allow clearance between said bushing and said substantially semicylindrical concave surface so that there is rocking movement therebetween.

18. A spacer-damper as claimed in claim 13 further comprising a bushing of a resilient material on said substantially semicylindrical concave surface of said clamp keeper.

19. A spacer-damper as claimed in claim 18 wherein said bushing of resilient material and said substantially semicylindrical concave surface of said clamp keeper have mutually facing surfaces, at least one of said mutually facing surfaces being convexly rounded to provide a taper so as to allow clearance between said bushing and said substantially semicylindrical concave surface so that there is rocking movement therebetween.

20. A spacer-damper as claimed in claim 1 wherein said elongated means for attaching said clamp body, said first and second damping mechanisms, and said clamp body cover to at least one of said substantially spherical portions of said rigid spacer means is a rivet, said rivet passing through said hourglass-shaped hole and cooperating therewith to limit the amount by which said clamp body rocks with respect to said rigid spacer means in response to longitudinal vibrations in said conductors.

* * * * *